Aug. 18, 1936.　　　H. NEUGEBAUER　　　2,051,387
PRINTING DEVICE FOR LENTICULAR ELEMENT FILMS
Filed June 29, 1934
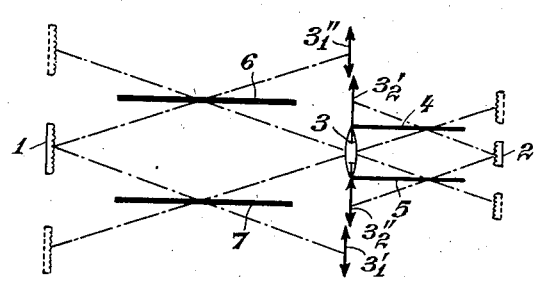
Hans Neugebauer
INVENTOR.
BY: Gifford, Scull & Burgess
ATTORNEYS.

Patented Aug. 18, 1936

2,051,387

UNITED STATES PATENT OFFICE 2,051,387

PRINTING DEVICE FOR LENTICULAR ELEMENT FILMS

Hans Neugebauer, Berlin-Lichterfelde, Germany, assignor to Opticolor Aktiengesellschaft, Glarus, Switzerland, a Swiss corporation Application June 29, 1934, Serial No. 733,049 In Germany July 6, 1933

3 Claims. (Cl. 88—24)

My invention relates to printing devices for lenticular element films.

It is a new and useful improvement of the devices described in the pending application Ser. No. 688,545, filed September 8, 1933, concerning "Printing apparatus for lenticulated films" of Kurt Räntsch.

The specification of that application describes devices for the projection copying of lenticular element films. In these devices, an optical system is employed, the relative aperture of which as seen from the film is smaller than the relative aperture of the lenticular elements. In order, nevertheless, to reproduce on the copying film the whole portion of the photographic layer situated behind the lenticular elements, means are so arranged that adjacent the real aperture system, virtual images of this aperture are seen from the film. By this means, it is possible for the optical system to act just as if it was of larger relative aperture, thereby utilizing the fact that it is corrected for a larger image angle than would be necessary alone by reason of the magnitude of the film image and its distance from the optical system.

The present invention relates to a further development of the device described above which device renders it possible to copy also with magnification or reduction of the size of the image.

Preferably, in designing the device according to this invention, a start is made from the side of the film of smaller size and the aperture of the objective and the position of the mirrors, which are arranged adjacent the objective and in which the images of the objective aperture are seen, are so determined that the objective apertures seen directly and those seen in the mirrors lie at the desired places relatively to the zones of the color filter employed in taking or reproducing. The objective apertures and also the position of the images of these objective apertures having been determined in this way from one side, the plane mirrors are arranged in a suitable manner on the other side—that is to say on the side on which the film of larger size is situated. For this purpose, lines connecting the centre of the objective to the images of the smaller film as seen in the mirrors are prolonged beyond the centre of the objective. The mirrors on the side of the larger film should then be so arranged that the images of this film lie in the said directions.

A device according to the invention is shown by way of example in the figure. With this device it is possible to copy from the larger film 1 on to the smaller film 2 and also conversely. The objective 3 therefore effects a change of the scale. Adjacent the objective, the two plane mirrors 4 and 5 are so arranged that the objective images $3_2'$ and $3_2''$ are seen from the film 2 in these mirrors adjacent the aperture of the objective 3. These images lie, for example, so that they assume, relatively to the film 2, the same position as the corresponding zones of the color filter in reproduction.

They may also lie somewhat eccentrically relatively to the corresponding filter zones in order in certain circumstances to render harmless unsymmetrical diffusions.

On the side of the original film 1, the mirrors 6 and 7 are arranged at a somewhat greater distance from the optical axis of the objective 3, so that, from the objective 3, the film 1 and its images seen in the mirrors 6 and 7 appear in the opposite directions to the film 2 and its images seen in the mirrors 4 and 5. The images of the objective aperture which are then seen from the film 1 are situated at $3_1'$ and $3_1''$.

Since the objective apertures seen from the film must not coincide exactly with the corresponding zones of the color filter, it is to a certain extent also possible at the same time to re-copy on those lenticular films in which the relative aperture of the lenticular elements differs from the lenticular elements of the original film. For this purpose, it is only necessary to arrange the mirrors 4 and 5 or 6 and 7 at somewhat other distances from the optical axis of the objective 3. In doing this, however, it is necessary to adhere always to the condition that the angles, at which the films with their images are seen from the objective are the same on both sides.

The magnitude of the objective aperture and the distance of the plane mirrors are, as described in the foregoing, preferably first fixed on the side of the film of smaller size, in order to be sure of preventing any overlapping of the different real or virtual objective apertures seen from the film of smaller size.

On the side of the film of larger size, there will then always be gaps between the apertures of the objective seen from the film, and these gaps must lie at the places at which are situated the lines of separation between the different zones of the color filter in taking or reproduction.

Having now particularly described and ascertained the nature of my said invention and in what manner the same is to be performed, I declare that what I claim is:—

1. In combination, an original film having thereon a multiplicity of lenticulations and a group of color records behind each of said lenticulations, a copy film having similar lenticulations thereon, means for passing light through the original film to the copy film, a lens disposed in the path of light passing between said films and nearer one film than the other, a set of mirrors disposed generally parallel to the optical axis of the lens between the lens and the original film and adapted to form images of the lens on opposite sides thereof as viewed from the original film, and another set of mirrors disposed generally parallel to the optical axis of the lens and adapted to form images of the lens on opposite sides thereof as viewed from the copy film, the mirrors in the set disposed between the lens and the more remote film being spaced apart from each other a greater distance than the mirrors in the other set.

2. In combination, an original film having thereon a multiplicity of lenticulations and a group of color records behind each group formed by exposure of the film through a color filter having as many zones as there are records in said group, a copy film having similar lenticulations thereon, means for passing light through the original film to the copy film, a lens disposed in the path of light passing between said films, a set of mirrors disposed generally parallel to the optical axis of the lens between the lens and the original film and adapted to form images of the lens on opposite sides thereof as viewed from the original film, the number of views of the lens and its images thus seen from the original film being the same as the number of zones in said filter, and another set of mirrors disposed generally parallel to the optical axis of the lens and adapted to form images of the lens on opposite sides thereof as viewed from the copy film, the number of views of the lens and its images thus seen from the copy film being the same as from the original film, and the films, lens, and sets of mirrors being so arranged relative to each other as to cause said views to appear larger from one film than from the other.

3. In combination, an original film having thereon a multiplicity of lenticulations and a group of color records behind each of said lenticulations, a copy film having similar lenticulations thereon, means for passing light through the original film to the copy film, a lens disposed in the path of light passing between said films and nearer one film than the other, a set of mirrors disposed generally parallel to the optical axis of the lens between the lens and the original film and adapted to form images of the lens on opposite sides thereof as viewed from the original film, and another set of mirrors disposed generally parallel to the optical axis of the lens and adapted to form images of the lens on opposite sides thereof as viewed from the copy film, the mirrors in the set disposed between the lens and the more remote film being spaced apart from each other a greater distance than the mirrors in the other set, the distances between mirrors in the respective sets being proportional to the distances between the lens and the respective films.

HANS NEUGEBAUER.